United States Patent Office 3,770,811
Patented Nov. 6, 1973

3,770,811
DIACRYLATE ESTERS OF HYDROGENATED
BIS-PHENOL AND TOLYLENE
Henry L. Lee, Jr., 745 Sierra Madre Blvd., San Marino,
Calif. 91108; Donald G. Stoffey, 15120 Hollis St.,
Hacienda Heights, Calif. 91745; Albert F. Stang, 12
Adler Strasse, 4 Dusseldorf 1, Germany; and Jan Alexander Orlowski, 1304 Rubio St., Altadena, Calif. 91001
No Drawing. Original application Feb. 12, 1971, Ser. No.
115,068. Divided and this application Mar. 23, 1973,
Ser. No. 344,159
Int. Cl. C07c 69/54
U.S. Cl. 260—486 R
5 Claims

ABSTRACT OF THE DISCLOSURE

Compounds of the formula:

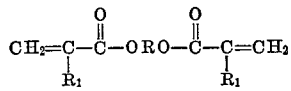

wherein R is selected from (A) 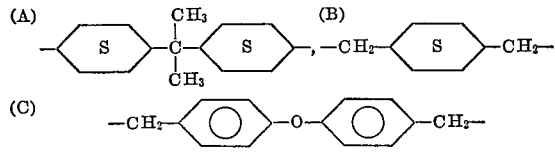 (B)

(C) 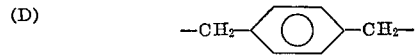

and (D) 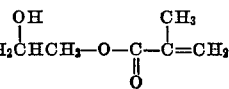

and $R_1$ is hydrogen, lower alkyl, or halogen, are utilized as binders in dental restorative compositions. The compounds are prepared by the reaction of an acryl chloride and derivatives thereof with the appropriate diol.

---

This is a divisional application of Ser. No. 115,068 filed Feb. 12, 1971.

BACKGROUND OF THE INVENTION

Field of the invention

This invention is related to certain thermosetting, acrylic resins and their use as binders in dental filling compositions for the direct filling of teeth.

Description of the prior art

Thermosetting acrylic esters of bisphenolic compounds have been used in the past for a variety of purposes, including, for example, the potting of electrical coils. Many such compounds are disclosed in U.S. Pat. 2,890,202.

Certain specific acrylic resins have been used as binders for dental restorative purposes. In particular, the compounds disclosed in Bowen in U.S. Pats. 3,066,112 and 3,179,623 have been used with some success. Chief among the resins of Bowen is a compound having the formula:

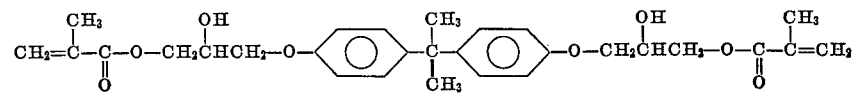

which is glycidyl methacrylate derivative of bisphenol-A and which is sometimes referred to as BIS–GMA. This compound has also been referred to as bisphenol-A-bis(3-methacrylate-2-hydroxypropyl) ether.

While the general properties of BIS-GMA are quite good for dental restorative compositions, the viscosity of the compound is very high and requires heating or dilution with other methacrylates to be used in ordinary dental practice.

SUMMARY OF THE INVENTION

The primary object of the present invention is to provide thermosetting resin binders for use in dental restorative compositions which binders have improved handling characteristics when compared to BIS-GMA, and also possess all the other favorable characteristics of BIS-GMA. It has been found that significantly improved thermosetting resins which are useful as binders in dental restorative compositions are obtained from monomeric compounds of the following formula:

$$CH_2=C-C-ORO-C-C=CH_2$$
with $R_1$ substituents and two C=O groups wherein R is selected from (A) 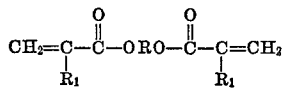

(B) 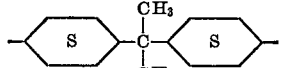

(C) 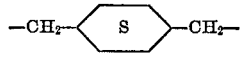

and (D) 

and $R_1$ is hydrogen, lower alkyl, or halogen.

In the foregoing formula, the preferred meaning of $R_1$ is methyl. R preferably is (A).

DESCRIPTION OF THE PREFERRED EMBODIMENTS

As indicated above, in accordance with the present invention, dental restorative compositions having improved handling characteristics due to the lower viscosities of the resin binder are obtained when compounds of the above formula are used as predominant binder components. The improved handling characteristics are obtained together with the favorable characteristics exhibited by the above described BIS-GMA. Furthermore, compounds of the present invention produce light stable polymers with significantly less water adsorption than BIS-GMA.

Of the compounds falling within the general formula above, which are useful in the practice of this invention, a preferred embodiment is a compound having the formula:

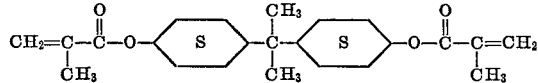

which is named 2,2-bis(4-methacrylatocyclohexyl)propane.

The foregoing monomer compound has a significantly lower viscosity than BIS-GMA. Because of this, it is much easier to handle and to formulate in various resin compositions. The polymers which are obtained are light stable and exhibit relatively lower water adsorption.

The compounds of the present invention may be prepared by the reaction of an acryl chloride or derivative thereof with the appropriate diol according to methods well known to those skilled in the art. The reaction is generally carried out in the presence of a tertiary amine such as triethylamine or pyridine as an acceptor for the hydrogen chloride generated in the reaction.

The following examples describing certain specific embodiments of the invention will serve to further illustrate the nature of the invention.

EXAMPLE 1

2,2-bis(4-methacrylatocyclohexyl)propane 10.5 g. of methacryl chloride are added slowly to the mixture of 12 g. of hydrogenated bisphenol-A, 10 g. of triethylamine and 100 ml. of dry chloroform. Following the completion of the addition, the mixture is cooled to room temperature with stirring and washed with dilute hydrochloric acid to remove the excess amine. The chloroform solution is then washed with water and dried over anhydrous magnesium sulfate. A small amount of p-methoxyphenol is added. The solvent is then removed in a rotary evaporator. The product obtained is a mixture of about equal parts of an amber oil and crystalline product.

EXAMPLE 2

Commercial hydrogenated bisphenol-A obtained from Monsanto Chemical Company is a glassy solid separated into two fractions by treatment with benzene. One fraction which begins to melt at 50° C. dissolves easily in the usual solvents. The second, and more insoluble fraction, melts at 120–175° C. The commercial product which as obtained melts from 50 to 120° C.

(a) To a mixture of 60 g. of the high melting hydrogenated bisphenol-A, 60 g. of triethylamine and 400 ml. of tetrahydrofuran, there is slowly added 54 g. of methacryl chloride, the temperature being maintained at 35° C. The addition with stirring takes 90 minutes. Following the addition of the methacryl chloride, the amine salt is filtered off and the filtrate added to 800 ml. of ice and water. The mixture is stored at −22° C. for 16 hours. The solid product is filtered off, washed with heptane and dried in an oven at 60° C. The infrared spectrum shows only a small amount of hydroxy group.

(b) To a mixture of 100 g. of the lower melting hydrogenated bisphenol-A, 100 g. triethylamine and 60 ml. of dry acetone, maintained at 30° C. there is slowly added 88 g. of methacryl chloride. The temperature is maintained between 25–30° C. Following the addition of the methacryl chloride, the amine salt formed is filtered off and the filtrate added to 2 litres of ice and water. The lower, oil layer which formed is separated and dried over anhydrous magnesium sulfate. A trace of hydroquinone is added to prevent polymerization. The remaining solvent is removed in a rotary evaporator to yield a pale amber viscous oil. The infrared spectrum indicates the presence of ester and vinyl groups.

As indicated, the monomeric resins of this invention are utilized as binders in dental restorative compositions. Typically, such compositions consist of approximately 65 to 75% by weight of finely divided solid particles of a filler and about 25 to 35% by weight of a resin binder.

The filler may be any finely divided solid which when dispersed through the binder system will give improved structural strength when the binder system is polymerized into a cured resin. The finely divided filler may have a particle size generally in the range of about 1 micron to about 150 microns. The preferred range is from about 7 microns to 30 microns. The best results are obtained where the inorganic filler is treated with a keying agent to improve the bond between the organic polymer binder and the surfaces of the finely divided filler particles. Keying agents which have been found highly suitable are the ethylenically unsaturated organosilane finishing or keying agents where the filler is fused silica, glass, aluminum oxide, or crystalline quartz and the binder system is of the type described. The finely divided filler may be treated with the keying agent, for example, in the manner described in U.S. Pat. 3,066,112 wherein an aqueous solution of tris(2-methoxyethoxy)vinyl silane is catalyzed with sodium hydroxide to give a pH of 9.3 to 9.8, and the filler treated with this solution, for example, one-half percent of the silane being used per weight of fused quartz. A slurry so formed is dried at about 125° C. and cooled.

Although aluminum oxide in the form of fused alumina, having a particle size of 10 microns to 50 microns, gives excellent compressive strength, it may not be desirable to use the same in preparing anterior dental fillings, as dental fillings using aluminum oxide, due to its extreme hardness and abrasive characteristics, can pick up marks from a metal utensil when rubbed against the same thus making such dental fillings, from the standpoint of appearance, possibly undesirable where such markings might become visible to a casual observer. However, because of the excellent wear resistance of fillings obtained using fused alumina, such fillings are highly suitable for filling teeth where any marking, through the contact with utensils, is less likely to occur, and if it should occur would not be visibly apparent to the causal observer.

When more translucent filling materials are desired, as for the filling of anterior teeth, glass beads, or a mixture of glass beads and quartz may be used.

The resins produced in accordance with the above examples are ready for use without dilution or treatment with a reactive diluent as has been necessary previously. About 0.5 to 1 percent by weight based on the weight of binder, or more, of an activator, such as, for example, dimethylparatoluidine, may be added to the resin. A suitable catalyst, such as, for example, 1 percent by weight benzoyl peroxide, based on the weight of binder, may be mixed into the treated filler material. The filler material containing the catalyst and the resin containing the activator may then be thoroughly mixed together and promptly placed in a cavity to be filled. The binder will polymerize at mouth temperature to harden the filling within about ten minutes.

Other suitable activators include, inter alia, para-toluene sulfinic acid, para-tolyl diethanol amine and other tertiary amines which are well known in the art. The amount of activator to be used depends on the particular compound utilized and on the working time desired. Generally the activator will be present in amounts of less than 1 percent by weight of the monomers in the binder.

While benzoyl peroxide is a preferred catalyst, other peroxide catalysts might be used as is well known in this art. The catalyst should preferably be present in an amount ranging from 1 percent to 2 percent by weight based on the weight of the monomers present in the binder.

The solid fillings formed from the compositions of this invention have high compressive strengths which are well within the standards as set forth in American Dental Association Specification No. 9. All of the characteristics of the composition of this invention indicate a high utility as a dental restorative material.

We claim:

1. A compound of the formula:

$$CH_2=C-\overset{O}{\overset{\|}{C}}-ORO-\overset{O}{\overset{\|}{C}}-C=CH_2$$
$$\phantom{CH_2=C}R_1 \phantom{-\overset{O}{\overset{\|}{C}}-ORO-\overset{O}{\overset{\|}{C}}-C=}R_1$$

wherein R is selected from

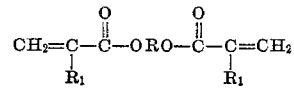

and

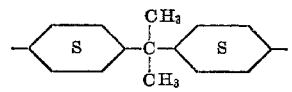

and $R_1$ is hydrogen, lower alkyl, or halogen.

2. A compound as claimed in claim 1 wherein $R_1$ is hydrogen.

3. A compound as claimed in claim 1 in wherein $R_1$ is methyl.

4. A comound as claimed in claim 3 wherein R is
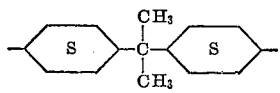
5. A compound as claimed in claim 1 wherein R is
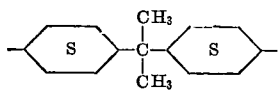
References Cited
UNITED STATES PATENTS
| | | | |
|---|---|---|---|
| 2,456,318 | 12/1948 | Ramier | 260—486 R |
| 2,830,078 | 4/1958 | Fekete | 260—486 R |
| 3,369,058 | 2/1968 | Keenan | 260—486 R |
LORRAINE A. WEINBERGER, Primary Examiner
P. J. KILLOS, Assistant Examiner
U.S. Cl. X.R.
106—35; 260—41 A, 41 B, 47 UA, 89.5 R, 486 H